United States Patent
Fincher et al.

(10) Patent No.: US 8,554,482 B2
(45) Date of Patent: Oct. 8, 2013

(54) MONITORING RESERVOIRS USING ARRAY BASED CONTROLLED SOURCE ELECTROMAGNETIC METHODS

(75) Inventors: Roger W. Fincher, Conroe, TX (US); Michael B. Rabinovich, Houston, TX (US); Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 294 days.

(21) Appl. No.: 12/436,005

(22) Filed: May 5, 2009

(65) Prior Publication Data

US 2010/0286915 A1    Nov. 11, 2010

(51) Int. Cl.
G01V 3/18    (2006.01)
G01V 3/12    (2006.01)
G01V 3/08    (2006.01)

(52) U.S. Cl.
CPC . *G01V 3/12* (2013.01); *G01V 3/083* (2013.01)
USPC .................................. 702/7; 702/11; 702/12

(58) Field of Classification Search
CPC ................ G01V 2210/624; G01V 2210/1299; G01V 2210/1499; G01V 2210/129
USPC ...................................................... 702/7, 12
See application file for complete search history.

(56) References Cited

U.S. PATENT DOCUMENTS

| | | | |
|---|---|---|---|
| 4,486,866 A | | 12/1984 | Muir |
| 5,335,542 A | * | 8/1994 | Ramakrishnan et al. .. 73/152.08 |
| 5,563,513 A | * | 10/1996 | Tasci et al. ..................... 324/359 |
| 5,770,945 A | | 6/1998 | Constable |
| 6,049,758 A | | 4/2000 | Bunks et al. |
| 6,060,885 A | * | 5/2000 | Tabarovsky et al. .......... 324/366 |
| 6,327,537 B1 | | 12/2001 | Ikelle |
| 6,556,014 B1 | * | 4/2003 | Kong et al. .................... 324/338 |
| 6,603,313 B1 | | 8/2003 | Srnka |
| 6,739,165 B1 | | 5/2004 | Strack |
| 6,906,982 B2 | | 6/2005 | Calvert |
| 7,109,717 B2 | | 9/2006 | Constable |
| 7,356,412 B2 | | 4/2008 | Tompkins |
| 7,482,813 B2 | | 1/2009 | Constable et al. |

(Continued)

FOREIGN PATENT DOCUMENTS

| | | |
|---|---|---|
| WO | WO2004086090 A2 | 10/2004 |
| WO | WO2005081016 A1 | 9/2005 |

(Continued)

OTHER PUBLICATIONS

Definition of "Diameter of Invasion", Schlumberger Oilfield Glossary, http://www.glossary.oilfield.slb.com/Display.cfm?Term=diameter%of%invasion, (last accessed Jul. 17, 2012).*

*Primary Examiner* — Sujoy Kundu
*Assistant Examiner* — Timothy H Hwang
(74) *Attorney, Agent, or Firm* — Cantor Colburn LLP (57) ABSTRACT

Electrical property contrast difference maps of the subsurface formations may be produced using surface and/or near surface array of transmitters and receivers tuned to emit and receive electromagnetic (EM) signals. The electrical property may be resistivity or conductivity. The maps may be time based. A time based trend change may be used to predict the location and movement of fluids within the hydrocarbon bearing or any other subsurface zones where resistivity and/or conductivity values of the fluids within these zones change over time.

10 Claims, 9 Drawing Sheets

(56) References Cited

U.S. PATENT DOCUMENTS

| | | |
|---|---|---|
| 2003/0048105 A1 | 3/2003 | Ellingsrud et al. |
| 2003/0050759 A1 | 3/2003 | Srnka et al. |
| 2004/0108854 A1 | 6/2004 | Nichols |
| 2005/0077902 A1 | 4/2005 | MacGregor et al. |
| 2005/0183887 A1* | 8/2005 | Rodney .................. 175/26 |
| 2005/0237063 A1 | 10/2005 | Wright et al. |
| 2006/0076956 A1* | 4/2006 | Sjolie et al. ............... 324/324 |
| 2008/0105425 A1 | 5/2008 | MacGregor et al. |
| 2009/0005993 A1* | 1/2009 | Abubakar et al. ............ 702/7 |
| 2009/0005994 A1 | 1/2009 | Srnka et al. |
| 2009/0306899 A1* | 12/2009 | Harris et al. ................ 702/13 |
| 2010/0039114 A1* | 2/2010 | Hornbostel et al. .......... 324/332 |
| 2010/0126717 A1* | 5/2010 | Kuchuk et al. ........... 166/250.03 |

FOREIGN PATENT DOCUMENTS

| | | |
|---|---|---|
| WO | WO2007053025 A1 | 5/2007 |
| WO | WO2007053251 A1 | 5/2007 |
| WO | WO2007130205 A2 | 11/2007 |
| WO | WO2008133793 A1 | 11/2008 |
| WO | WO2008156517 A1 | 12/2008 |

\* cited by examiner

MONITORING RESERVOIRS USING ARRAY BASED CONTROLLED SOURCE ELECTROMAGNETIC METHODS

BACKGROUND OF THE DISCLOSURE

1. Field of the Disclosure

The disclosure relates generally to systems and methods for characterizing subsurface formations.

2. Description of the Related Art

Hydrocarbons such as oil and gas are recovered from a subterranean formation using a wellbore drilled into the formation. Such wells are typically completed by placing a casing along the wellbore length and perforating the casing adjacent each production zone to extract the formation fluids, such as hydrocarbons, into the wellbore. These production zones are sometimes separated from each other by installing a packer between the production zones. Fluid from each production zone entering the wellbore is drawn into a tubing that runs to the surface. It is desirable to have substantially even drainage along the production zone. Uneven drainage may result in undesirable conditions such as an invasive gas cone or water cone. Thus, during the life of an oil field, it may be useful to monitor changes in the hydrocarbon reservoir during gas/oil extraction.

The present disclosure addresses these and other need for techniques and devices for characterizing and assessing subsurface formations, such as hydrocarbon reservoirs.

SUMMARY OF THE DISCLOSURE

It should be understood that examples of the more important features of the disclosure have been summarized rather broadly in order that detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

The advantages and further aspects of the disclosure will be readily appreciated by those of ordinary skill in the art as the same becomes better understood by reference to the following detailed description when considered in conjunction with the accompanying drawings in which like reference characters designate like or similar elements throughout the several figures of the drawing and wherein.

DETAILED DESCRIPTION OF THE EMBODIMENTS

The present disclosure relates to devices and methods for monitoring subterranean reservoirs. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein.

Controlled source low frequency electromagnetic energy (CSEM) radiated from the surface into the earth below may be used to identify subsurface anomalous zones wherein the electrical resistivity of the earth is different from an overlying or underlying strata. Examples of such zones include subsurface resistive bodies, such as hydrocarbon reservoirs, gas injection zones, and fresh-water aquifers. The identification and characterization of changes, e.g., boundaries or discontinuities, in subsurface resistivity using CSEM may be used to refine and enhance interpretation of seismic mapping. CSEM techniques may also be used as a stand alone technique to identify zones of potential interest. In aspects, CSEM may be utilized to delineate fluids with contrasting electrical resistivity properties in order to monitor one or more parameters associated with such fluids. Illustrative parameters include, but are not limited to, location, orientation, composition, direction of movement, rate of migration, etc. Illustrative embodiments utilizing CSEM are discussed below.

Figure 1:
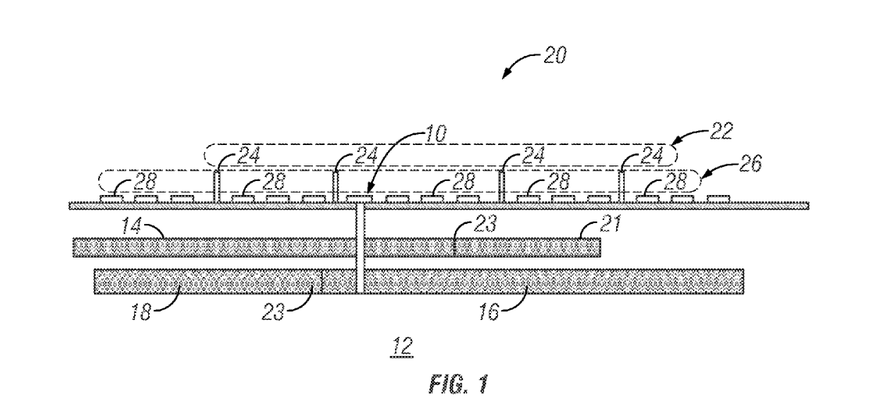
FIG. 1 is a schematic elevation view of an exemplary system for monitoring subterranean reservoirs in accordance with one embodiment of the present disclosure.

Referring initially to FIG. 1, there is shown an exemplary wellbore 10 that has been drilled through the earth 12 and into two reservoirs 14, 16 from which it is desired to produce hydrocarbons. Two reservoirs are shown for exemplary purposes and the number two should not be construed as a limitation. In one embodiment, a monitoring system 20 may be utilized to monitor time based trends associated with fluid movement within the reservoirs 14, 16. The monitoring system 20 may be utilized in connection with conventional production operations. The monitoring system 20 may also be utilized in connection with production operations wherein water or gas flooding is used to sweep hydrocarbons through the hydrocarbon bearing strata. The monitoring system 20 may be configured to characterize the resistivity contrast between two or more fluids, e.g., oil and water 18 or gas 21, in order to predict a location of a given boundary 23 between the two fluids, which may be referred to as a fluid front.

In one embodiment, the monitoring system 20 may include a surface and/or near surface array 22 of transmitters 24 and an array 26 of receivers 28 that are configured to emit and receive, respectively, selected low frequency (EM range) signals. Those versed in the art and having benefit of the present disclosure would recognize that inversion methods may be used for obtaining a resistivity model of the subsurface that would be indicative of the fluid front. However, for the purposes of monitoring, it is not necessary to perform this computationally intensive task. Instead, the signals may be processed to determine the locations or boundaries for changes in resistivity. For example, a significant change in resistivity would be noticed for a particular transmitter receiver pair when the fluid front is directly beneath a location midway between the transmitter and the receiver. Averaging may be done for different transmitter-receiver pairs to more clearly estimate the location of the boundary. These boundaries, which may be indicative of fluid fronts, may be visually depicted on a map. Successive "snap shots" of the subsurface formation may be taken over a period of time, say days or weeks. The "snap shots" may then be combined to form a time-based resistivity contrast difference map of one or more subsurface formations. The time-based trend in resistivity contrast changes may then be used to predict the location and movement of fluids within the hydrocarbon bearing one or any other subsurface zones where resistivity and/or conductivity values of the fluids within these zones change over time. These data and the resulting model outputs would be used to produce a time based 'image' of the production zone that may allow the operator to optimize both hydrocarbon extraction and well as flood fluid injection.

Figure 2:
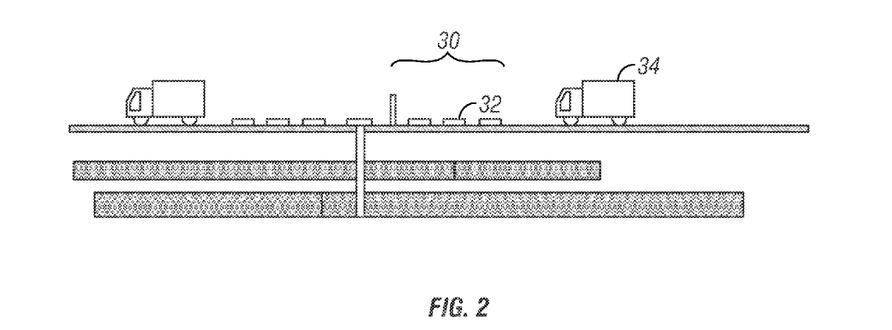
FIG. 2 is a schematic elevation view of one embodiment of a monitoring system in accordance with one embodiment of the present disclosure that uses transmitters and receivers in the wellbore.

The arrays 22, 26 may be either permanent or mobile. A permanent array 22, 26 may be used in applications wherein it is desirable to record data over a plurality of time periods using the same spatial and electrical properties for some or all the time periods. For example, a permanent array 22, 26 may be "hard wired" to a centrally located facility equipped with emitting and recording equipment. A permanent array 22 may be configured to image the subsurface formation on a fixed schedule or when desired. Referring now to FIG. 2, Embodiments of non-permanent arrays 22 may utilize array subsets 30 that may be wired to local hubs 32. The local hub 32 may be configured to operatively couple or otherwise communicate with mobile units 34 that are equipped with signal generation and receiving equipment. The mobile units 34 may be configured to energize subsets of the array 22 at different times, e.g., over a test period of several days. Once all the subset arrays have been energized and recorded, suitable modeling and mathematical methods may be used to produce an overall data set. In some applications, the measurable effect from a resistive object, e.g., a hydrocarbon, may be obtained when the lateral size of the object is at least two times bigger than the depth to the object. Under such favorable conditions the measured signal can be reliably interpreted and parameters such as the depth to the object, its thickness, and resistivity can be determined.

In aspects, the monitoring system 20 may be configured for mapping and monitoring deep resistive objects representing hydrocarbon deposits using a combination of an electric dipole transmitter and the electric dipole receivers that operate at a frequency range between 0.1 and 1 Hz. The low frequency range maybe selected using factors that may include, but are not limited to, the desired depth of investigation of the surface array. Additionally, in certain arrangements, the array 20 may utilize a transmitter-receiver spacing that is close to or equal to the radius of a hydrocarbon-bearing body.

In aspect, the monitoring system 20 may be utilized in subsea wells. In such applications, the transmitter and receiver electrical lines may be located close to or at the bottom of the salt water layer. The signal strength may decrease by two orders of magnitude, while the effect of the hydrocarbon body may increase by a factor of five or so. In such an environment, the current amplitude for reliable detection of the objects may range from 10 kA and above, depending on the size and depth to the object of interest.

Figure 3:
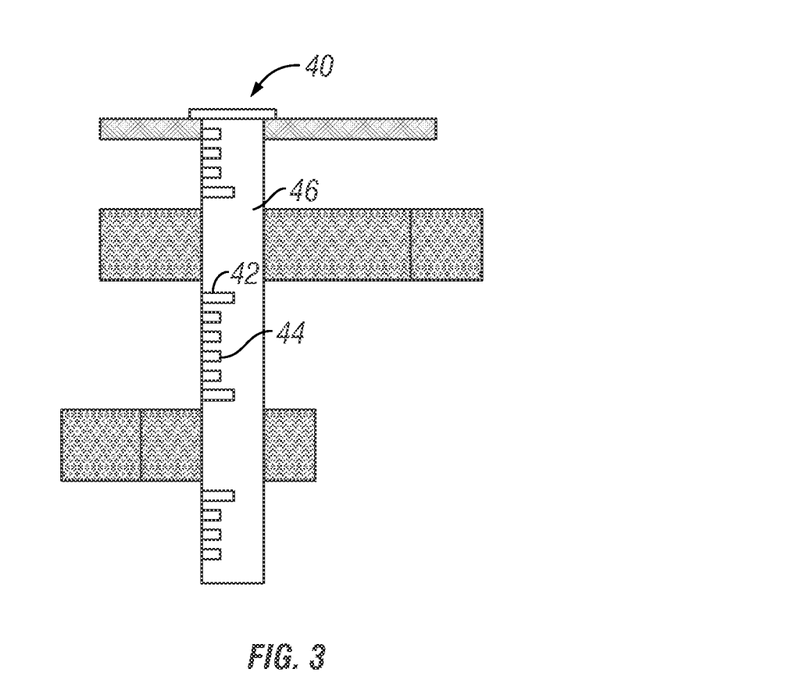
FIG. 3 is a schematic elevation view of one embodiment of a monitoring system in accordance with one embodiment of the present disclosure that uses transmitters in the wellbore.
Figure 4:
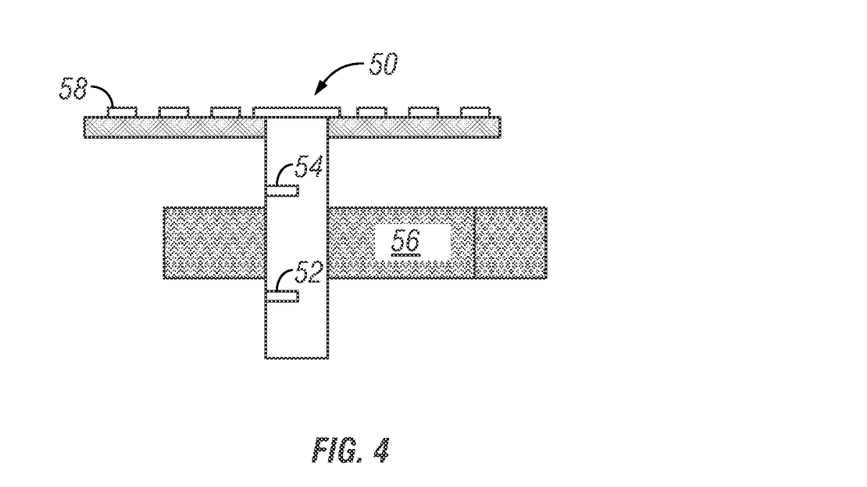
FIG. 4 is a schematic elevation view of one embodiment of a monitoring system in accordance with one embodiment of the present disclosure that uses transmitters in the wellbore.

Referring now to FIG. 3, in certain embodiments, a monitoring system 40 may include one or more transmitters 42 and/or one or more receivers 44 in a well 46. Such an arrangement may be used to stack the signals, which may improve signal-to-noise ratios. Referring now to FIG. 4, in certain embodiments, a monitoring system 50 may utilize one or more transmitters 52 that are located in a well 54 above and/or below a hydrocarbon layer 56 while one or more receivers 58 are located on the surface. Also, the positions of the transmitters 52 and the receivers 58 in FIG. 4 may be switched. These are illustrative configurations of transmitter/receiver arrays that may improve the delineating and monitoring capabilities of CSEM systems made in accordance with the present teachings.

Figure 5:
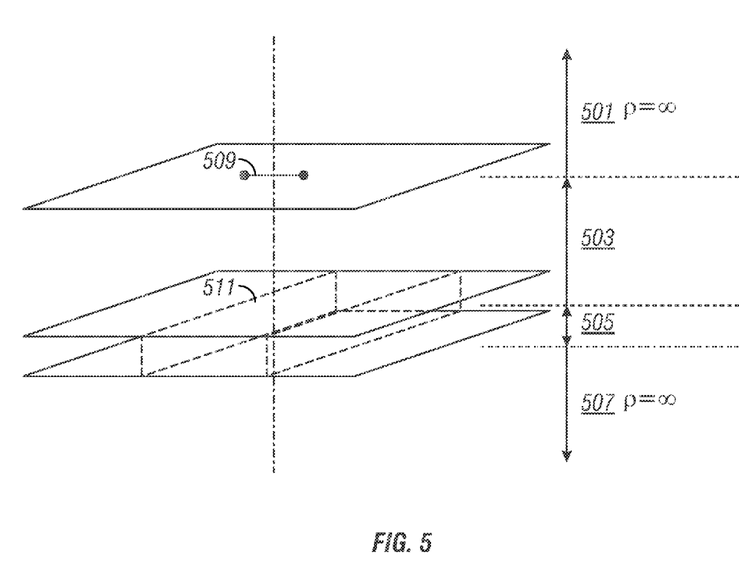
FIG. 5 is an exemplary model of a resistive disc located in a conductive half space.

In order to make a quantitative evaluation of different transmitter and receiver configurations, simulation results from the model of FIG. 5 are discussed. The model consists of un upper half space 501 having infinite resistivity, and layers 503, 505, 507 with a resistivity of 10 Ω-m. Within layer 505 having a thickness of 200 ft. is a disk (denoted by 511) having a resistivity of 100 Ω-m. The layer 503 has a thickness of 1000 ft. The source is indicated by the dipole 509 at the surface.

Figure 6:
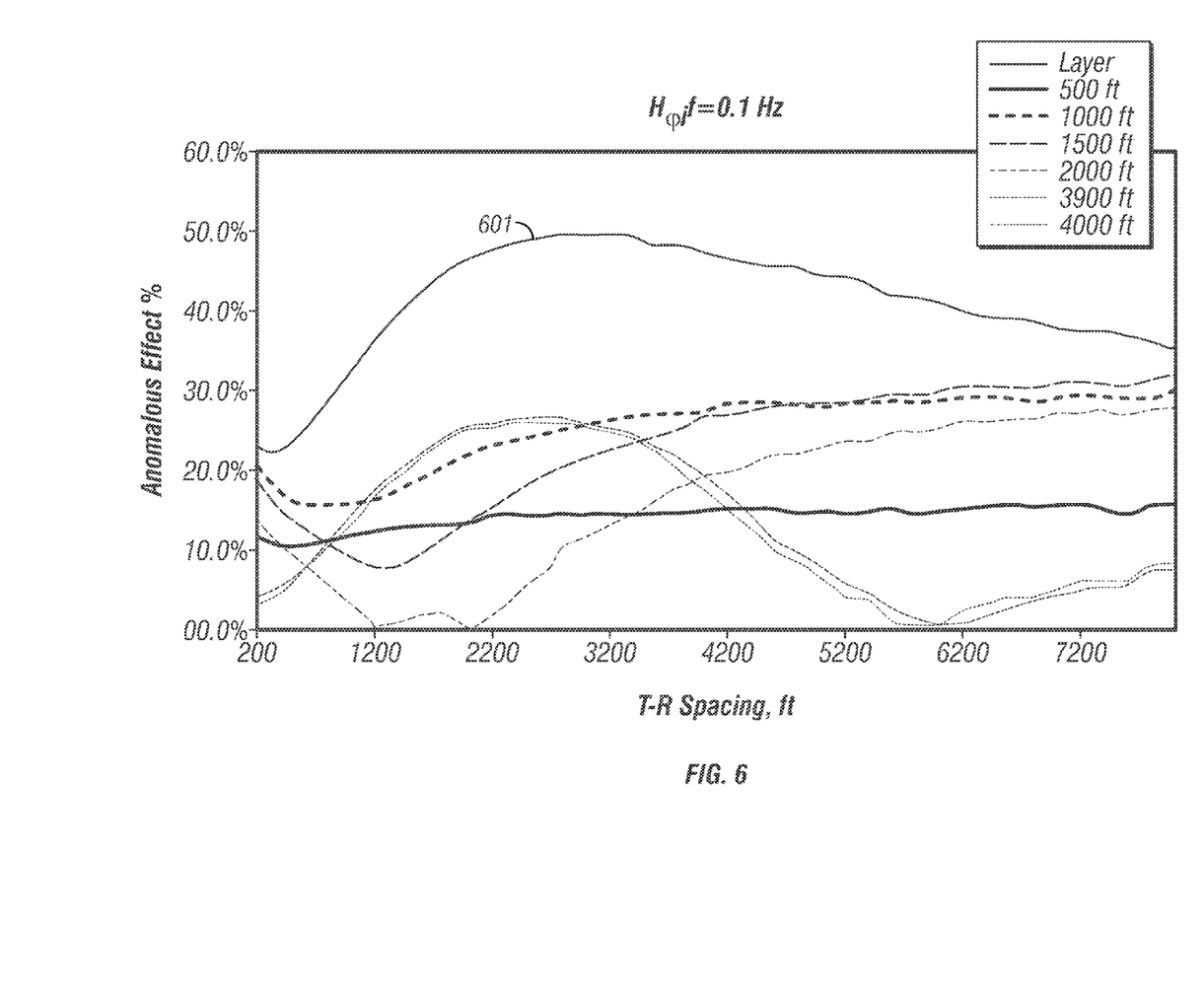
FIG. 6 shows an exemplary response for an electric dipole transmitter and a magnetic dipole receiver.

FIG. 6 shows exemplary responses when the source 509 is an electric dipole. The curves in FIG. 6 correspond to the anomalous effect (ordinate) as a function of transmitter-receiver distance (abscissa) for different disk sizes. The receiver for this example was a magnetic dipole sensitive to the $H_{100}$ component. The anomalous effect is defined according to the relation $$\frac{|\varepsilon_{homog} - \varepsilon_{anom}|}{\varepsilon_{homog}} \cdot 100\%, \qquad (1)$$

where $\varepsilon_{homog}$ is the signal from the formation model with no anomalous object and $\varepsilon_{anom}$ corresponds to the signal estimated for the model which includes the object of interest.

FIG. 6 shows that even for a disk of infinite radius, the maximum anomalous effect is less than 5%. A good rule of thumb is that the anomalous effect should be at least 30% for a measurement to be of practical significance. See 601. The other curves in FIG. 6, not labeled, correspond to disk sizes ranging from 500 ft to 4000 ft.

Other studies indicate that receivers that measure the magnetic dipole are, in general, not able to provide adequate identification of a buried layer. Accordingly, additional discussions herein are limited to an electric dipole transmitter and an electric dipole receiver.

Figure 7:
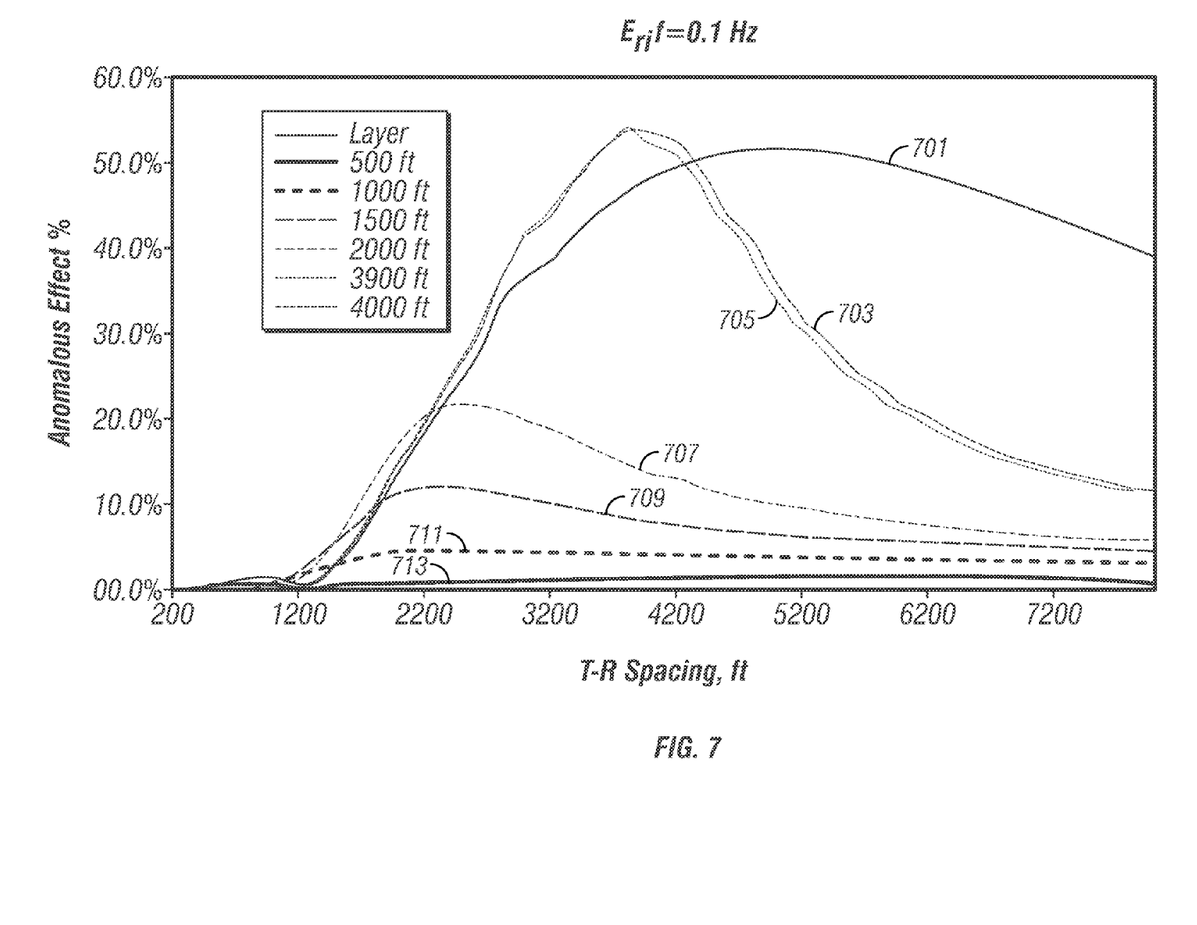
FIG. 7 shows an exemplary response for an electric dipole transmitter and a electric dipole receiver for a frequency of 0.1 Hz.

FIG. 7 shows the simulated response when the radial component of the electric field $E_r$ is measured for a source frequency of 0.1 Hz. The curves 701, 703, 705, 707, 709, 711, 713 correspond to disk size of infinity, 4000 ft., 3000 ft., 2000 ft., 1500 ft., 1000 ft. and 500 ft. respectively. We observe significant increase of sensitivity of electric component $E_r$ to the lateral size (radius) of the disk. Specifically, for the disk radius of 1500 ft., the anomalous effect reaches more than 10% and almost linearly grows as the radius increases: for the disk radius of 2000 ft., the anomalous effect is about 20% and it goes up to 50% for the radius of 4000 ft. Notice that in case of transmitter/receiver spacing less than the radius of the disk ($r/R_d$<1), the anomalous effect from the infinite layer is the same as from the disk. This fact offers significant simplification during interpretation when depth to the localized object (disk) can be determined by the means developed for interpretation of 1-D models (infinite horizontal layers). These conclusions also hold for receiver dipoles positioned at an azimuth of 45° and for the radial and transverse electric dipoles.

Figure 8:
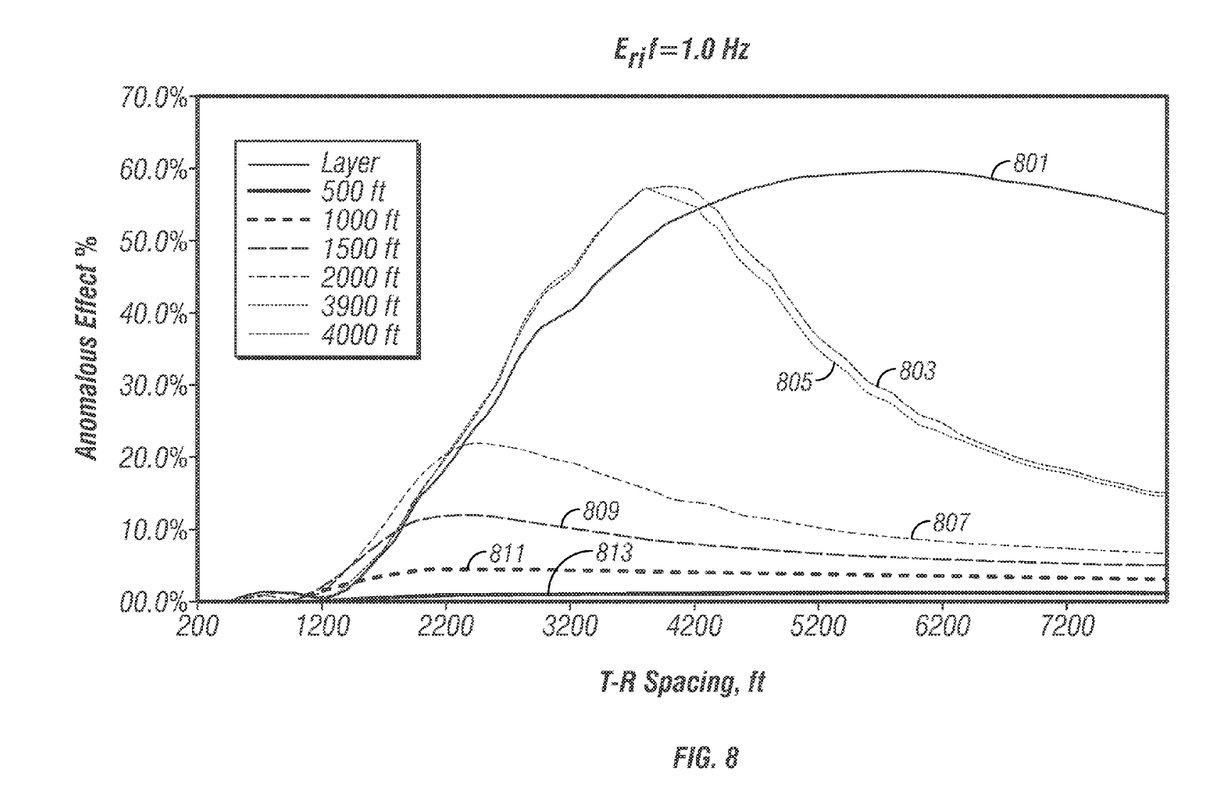
FIG. 8 shows an exemplary response for an electric dipole transmitter and a electric dipole receiver for a frequency of 1.0 Hz.

FIG. 8 shows corresponding results for a source frequency of 1.0 Hz. The curves 801, 803, 805, 807, 809, 811, 813 correspond to disk size of infinity, 4000 ft., 3000 ft., 2000 ft., 1500 ft., 1000 ft. and 500 ft. respectively.

Overall, based on the presented modeling results we conclude that the system based on Electric Dipole Transmitter and Electric multi-component receivers do offer sufficient resolution power to be used for detection of local resistive object surrounded by the conductive formation. The radial component of the electric field has sufficient resolution power for monitoring properties of the resistive object if the longitudinal size of the object (diameter of the disk) is at least six times bigger than the depth to the object. In this case, anomalous effect from the object of interest exceeds 30% and can be reliably detected by the set of electrical receivers placed along profile at the distance up to 4000 ft. from the transmitter.

We next show modeling results on the sensitivity of the results to the resistivity, thickness and depth of the disk. Our first example is an illustration of dependency of anomalous effect on the resistivity of the disk. The radius of the disk is 4000 ft. and it is placed at the depth of 1000 ft. The electrical transmitter, oriented in x-direction, is 100 ft. long and operates at the frequency of 0.1 Hz and current 1 amp. The receiver, oriented in x-direction, is assumed to be 1 m long. First, we estimate an anomalous effect for the disk with resistivity of 100 Ω-m placed in the host medium (half-space) with resistivity of 100 Ω-m. The thickness of the disk is 200 ft. Then we change resistivity of the disk to 50 Ω-m and estimate anomalous effect from the disk again. Results are presented in FIG. 9 (right Y-axis shows percents of anomalous effect and X-axis depicts a transmitter/receiver spacing). Also on the same plot we show the signal level in mV (left Y-axis) to illustrate the signal level in the analyzed models. The curves 901, 903 are the anomalous effects for disk resistivities of 100 Ω-m and 50 Ω-m respectively while 901', 903' are the signal levels (almost indistinguishable from each other).

Figure 9:
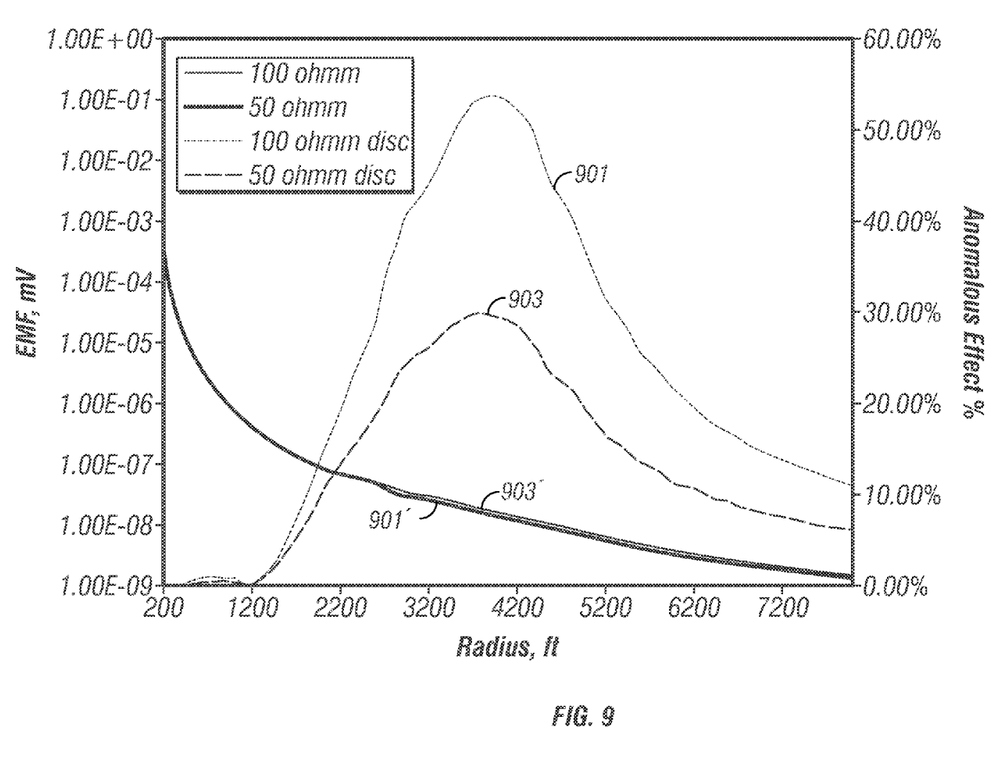
FIG. 9 illustrates the effect of different resistivities of the disk.

As we see from FIG. 9, the anomalous effect almost linearly depends on the resistivity contrast between the object and the host medium- the greater the contrast, the bigger the effect of the disk on the measured electric field. At the spacing of 4000 ft. (which is an optimal spacing in terms of anomalous effect from the object of interest), the signal level is about 10 nV, which can be increased by a factor of 100 either by increasing length of the receiver dipole or current in the transmitter. Considering 1 μV as the lowest detectable limit and 30% as a minimum required resolution, we conclude that analyzed models represent extreme models for the application of CSEM for monitoring and detection of the resistive objects. In the other words, in order to successfully use CSEM, the object should be 200 ft. thick, at least six times bigger than the depth of investigation and five times more resistive than the host medium.

Figure 10:
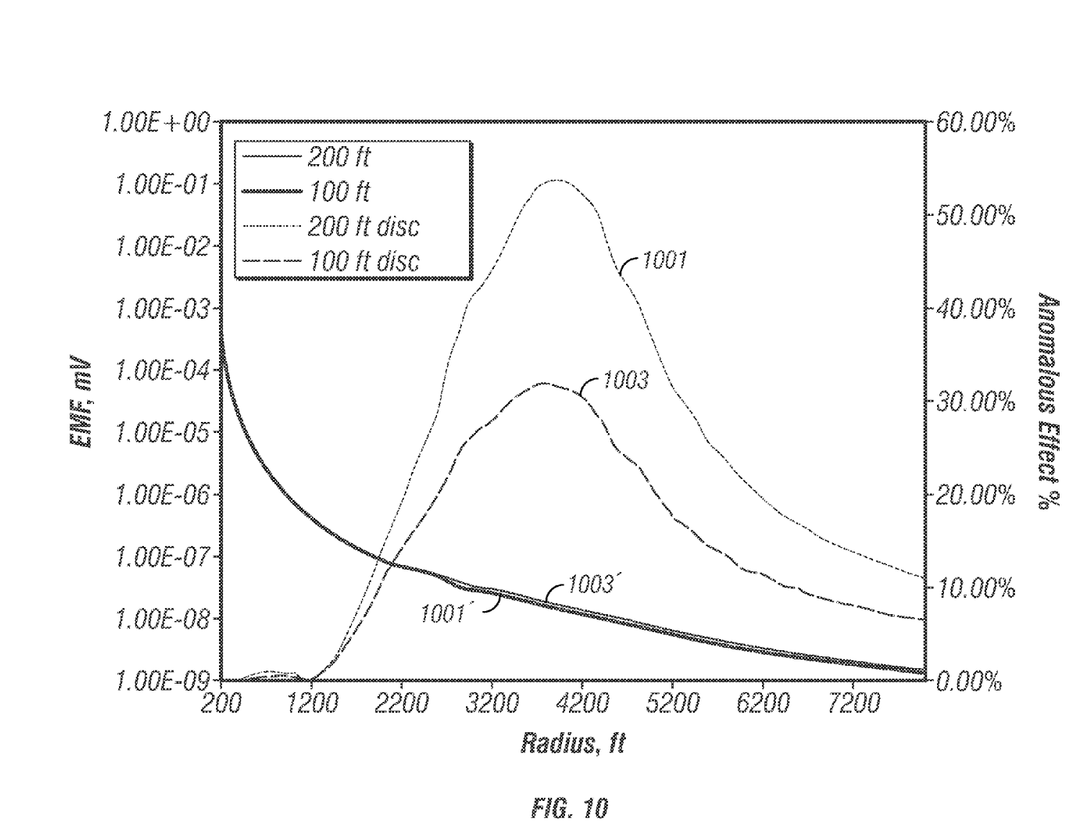
FIG. 10 illustrates the effect of different thicknesses of the disk.
Figure 11:
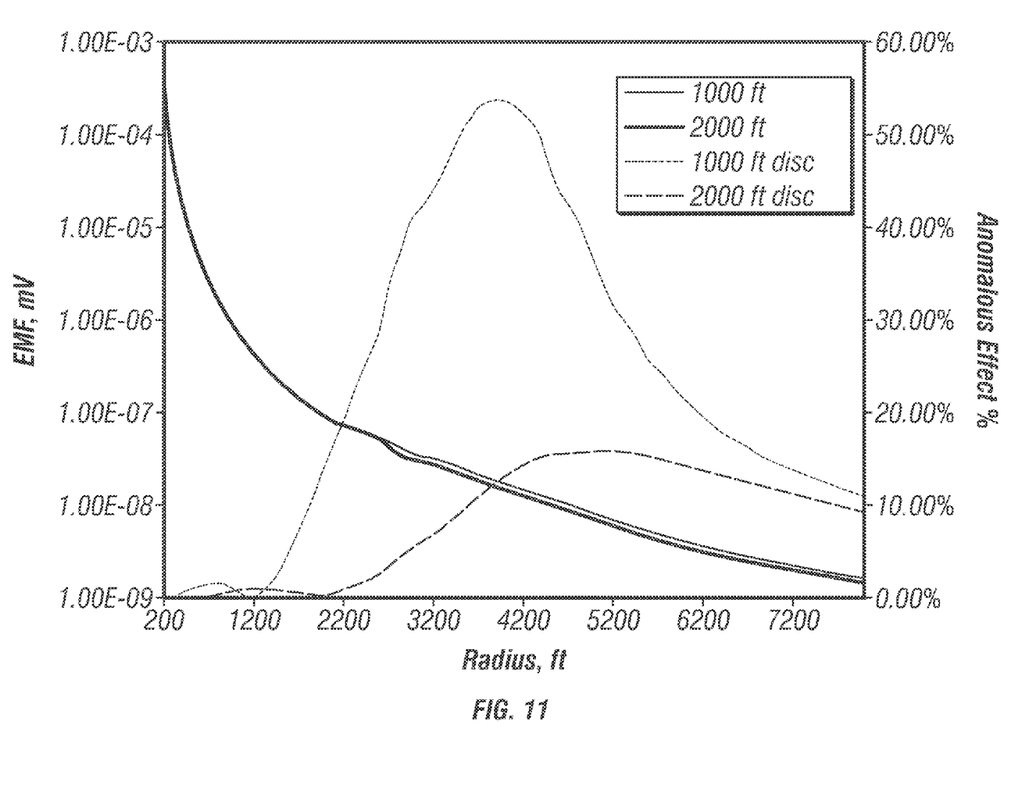
FIG. 11 illustrates the effect of different depths of the disk.

In fact, an important parameter which controls resolution is the product of object's resistivity and thickness. This is illustrated by FIG. 10, where we present mathematical modeling results for the 100 and 200 ft. thick disk, surrounded by a 10 Ω-m formation. Again, we present anomalous effect (right Y-axis) and signal level (left Y-axis) for both models. The curves 1001, 1003 are the anomalous effects for disk thicknesses 200 ft. and 100 ft. respectively while 1001', 1003' are the signal levels (almost indistinguishable from each other). By comparing FIGS. 9 and 10 we can see that models with the same parameter (ρ·h) produce similar anomalous effect and similar signals in the electrical receiver.

We found that in order to create 30% anomalous effect the parameters of the object have to satisfy the following condition:

$$\frac{1}{5} \cdot \frac{\rho_1}{\rho_2} \cdot \frac{h}{H} \cdot \frac{R}{H} \geq 1, \qquad (2)$$

where
$\rho_1$—resistivity of the object
$\rho_2$—resistivity of the host medium
h—thickness of the object
H—depth to the object
R—radius of the object For the problem of reservoir monitoring, the quantities H (depth to the top of a reservoir), h (the thickness of the reservoir), $\rho_2$ (resistivity of the non-reservoir rock) and $\rho_1$ (resistivity of the fluid being injected into the reservoir) are all known. There are two quantities that can be controlled. The first is the transmitter-receiver distance. A desirable T-R distance can be estimated from numerical simulations of the kind discussed above to find a spacing that gives the largest anomalous effect. The second parameter that can be controlled to some extent is $\rho_1$, the resistivity of the injected fluid into the reservoir. This can be manipulated by including additives in the fluid being injected in the injection well.

In another embodiment, a CSEM system configured for deep subsurface mapping or/and monitoring may utilize a transient EM technique, wherein the DC electrical current is instantaneously switched off in the transmitter and the effects of secondary currents are measured in receiver. An advantage of this technique is the absence of the direct field that allows measuring very small signals at very late times that are representative of electrical resistivity of deep objects in the formation.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure.

What is claimed is:

1. A method for characterizing an earth formation, comprising:
    positioning an electric dipole transmitter at a first location with respect to a conductive layer of the earth formation;
    using a numerical formation model to estimate an offset distance of the electric dipole transmitter and an electric dipole receiver for obtaining an anomalous effect from a resistive object in the conductive layer of the earth formation above a selected value;
    positioning the electric dipole receiver at the estimated offset distance from the electric dipole transmitter;
    generating a first electromagnetic signal using the electric dipole transmitter at a first time;
    receiving a first signal from the earth formation responsive to the electromagnetic signal generated at the first time at the electric dipole receiver;
    estimating a thickness and resistivity of the resistive object in the conductive layer using the received first signal; and
    using the estimated thickness and resistivity, a radius of the resistive object and a depth of the resistive object to select a resistivity of a fluid that when injected into the conductive layer provides at least 30% anomalous effect from the object.

2. The method of claim 1 further comprising:
(i) injecting a fluid into the conductive layer having the selected resistivity,
(ii) generating a second electromagnetic signal using the transmitter at a second time after the fluid injection,
(iii) using the receiver to receive a second signal responsive to the second electromagnetic signal, and
(iv) identifying a location of a resistivity change in the conductive layer at the second time using the received second signal.

3. The method of claim 1, wherein the estimated characteristic of the object includes at least one of: (i) a depth to the object, (ii) a thickness of the object, (iii) a resistivity of the object, (iv) a radial size of the object, and (v) a resistivity of a layer encompassing said object.

4. The method of claim 1, wherein the selected value of the anomalous effect is 30%.

5. The method of claim 2 further comprising:
altering the resistivity of the injected fluid.

6. The method of claim 2 wherein the fluid is one of: (i) water, and (ii) gas.

7. A system for evaluating an earth formation, comprising:
an electric dipole transmitter configured to generate an electromagnetic signal into a conductive layer of the earth formation at a first time;
an electric dipole receiver positioned at an estimated offset distance from the electric dipole transmitter configured to receive a first signal from the earth formation responsive to the electromagnetic signal generated at the electric dipole transmitter at the first time; and
a processor configured to:
use a numerical formation model to estimate the offset distance so as to obtain an anomalous effect from a resistive object in the conductive layer above a selected value,
estimate a thickness and resistivity of the resistive object in the conductive layer using the first signal, and
use the estimated thickness and resistivity, a radius of the resistive object and a depth of the resistive object to select a resistivity of a fluid that when injected into the conductive layer provides at least 30% anomalous effect from the object.

8. The system of claim 7 further comprising:
(i) a fluid source configured to inject a fluid having the selected resistivity into the conductive layer;
wherein,
(ii) the electric dipole transmitter is further configured to generate a second electromagnetic signal at a second time,
(iii) the electric dipole receiver is further configured to receive a second signal from the conductive layer of the earth formation responsive to the second electromagnetic signal, and
(iv) the processor is further configured to determine identify a location of a resistivity change in the layer of the earth formation at the second time using the received second signal.

9. The system of claim 8 wherein the fluid source is further configured to:
alter a resistivity of the injected fluid.

10. The system of claim 8 wherein the fluid is one of: (i) water, and (ii) gas.

* * * * *